(12) United States Patent
Drane et al.

(10) Patent No.: US 10,106,303 B2
(45) Date of Patent: Oct. 23, 2018

(54) CABLE TIE HEAD

(71) Applicant: Thomas & Betts International, LLC, Wilmington, DE (US)

(72) Inventors: Mark R. Drane, Germantown, TN (US); Yan Gao, Memphis, TN (US); Bobby N. Norwood, Leoma, TN (US); Cong T. Dinh, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 131 days.

(21) Appl. No.: 14/730,756

(22) Filed: Jun. 4, 2015

(65) Prior Publication Data

US 2015/0266637 A1    Sep. 24, 2015

Related U.S. Application Data

(62) Division of application No. 13/790,452, filed on Mar. 8, 2013, now Pat. No. 9,061,807.

(60) Provisional application No. 61/644,079, filed on May 8, 2012.

(51) Int. Cl.
B65D 63/10 (2006.01)
F16B 2/26 (2006.01)

(52) U.S. Cl.
CPC ..... B65D 63/1063 (2013.01); B65D 63/1027 (2013.01); F16B 2/26 (2013.01); *B65D 2563/101* (2013.01); *B65D 2563/108* (2013.01); *Y10T 24/1498* (2015.01)

(58) Field of Classification Search
CPC ................................................ Y10T 24/1498
USPC ........................................................ 248/74.3
See application file for complete search history.

(56) References Cited

U.S. PATENT DOCUMENTS

| | | |
|---|---|---|
| 2,809,065 A | 10/1957 | Erke |
| 3,300,825 A | 1/1967 | Andreasen |
| 3,484,905 A | 12/1969 | Eberhardt |
| 3,494,002 A | 2/1970 | Kabel |
| 3,530,544 A | 9/1970 | Burniston |
| 3,562,870 A | 2/1971 | Sund |
| 3,588,961 A | 6/1971 | Farago |
| 3,591,223 A | 7/1971 | Castro Neto |
| 3,875,618 A | 4/1975 | Schuplin |
| 3,909,884 A | 10/1975 | Weckesser |
| 4,128,919 A | 12/1978 | Bulanda et al. |
| 4,399,593 A | 8/1983 | De Bradandere et al. |
| 4,422,217 A | 12/1983 | Barrette |
| 4,447,934 A | 5/1984 | Anscher |
| 4,498,507 A | 2/1985 | Thompson |

(Continued)

FOREIGN PATENT DOCUMENTS

| | | |
|---|---|---|
| CA | 2581880 | 9/2007 |
| CA | 2753066 | 8/2010 |

*Primary Examiner* — Robert Sandy
*Assistant Examiner* — Michael S Lee
(74) *Attorney, Agent, or Firm* — Taft Stettinius & Hollister LLP

(57) ABSTRACT

A cable tie includes a cable tie head that comprises a head portion. The cable tie also includes a cable tie body. The cable tie body comprises a main body that includes a body passageway; and a strap, wherein the cable tie head is attachable to and detachable from the cable tie body, and wherein the body passageway is formed to receive the legs for coupling the cable tie head with the cable tie body. The cable tie head is made from a different material than the cable head body.

14 Claims, 12 Drawing Sheets

(56) References Cited

U.S. PATENT DOCUMENTS

| | | |
|---|---|---|
| 4,653,155 A | 3/1987 | Hara |
| 4,680,834 A | 7/1987 | Andre et al. |
| 4,765,032 A | 8/1988 | Fortsch |
| 4,868,953 A | 9/1989 | Fortsch |
| 5,121,524 A | 6/1992 | Mortensen |
| 5,123,686 A | 6/1992 | Wenk |
| 5,193,251 A | 3/1993 | Fortsch |
| 5,544,391 A | 8/1996 | Hoffman |
| 5,568,952 A | 10/1996 | Ruegg |
| 5,722,123 A | 3/1998 | Davignon et al. |
| 5,956,814 A | 9/1999 | Choi |
| 6,014,792 A | 1/2000 | Marelin et al. |
| 6,119,314 A | 9/2000 | Freed |
| 6,128,809 A | 10/2000 | Khokhar |
| D435,438 S | 12/2000 | West |
| 6,219,887 B1 | 4/2001 | Parsons |
| 6,339,865 B1 | 1/2002 | Takahashi et al. |
| 6,347,434 B1 | 2/2002 | Newman |
| 6,443,403 B1 * | 9/2002 | Page ............ F16L 3/1233 24/16 PB |
| 6,532,631 B2 | 3/2003 | Rohaly et al. |
| 6,807,714 B2 | 10/2004 | O'Young et al. |
| 6,928,701 B2 | 8/2005 | Hutter, III |
| 6,978,520 B2 | 12/2005 | Falany |
| 7,328,487 B2 | 2/2008 | Hoffman et al. |
| 7,360,281 B1 | 4/2008 | MacCartey et al. |
| 7,373,695 B2 | 5/2008 | Caveney et al. |
| 7,603,751 B2 | 10/2009 | Caveney et al. |
| 7,866,007 B2 | 1/2011 | DeBerry et al. |
| 2011/0167594 A1 | 7/2011 | Gmeilbauer |
| 2012/0084948 A1 | 4/2012 | Breen et al. |

\* cited by examiner

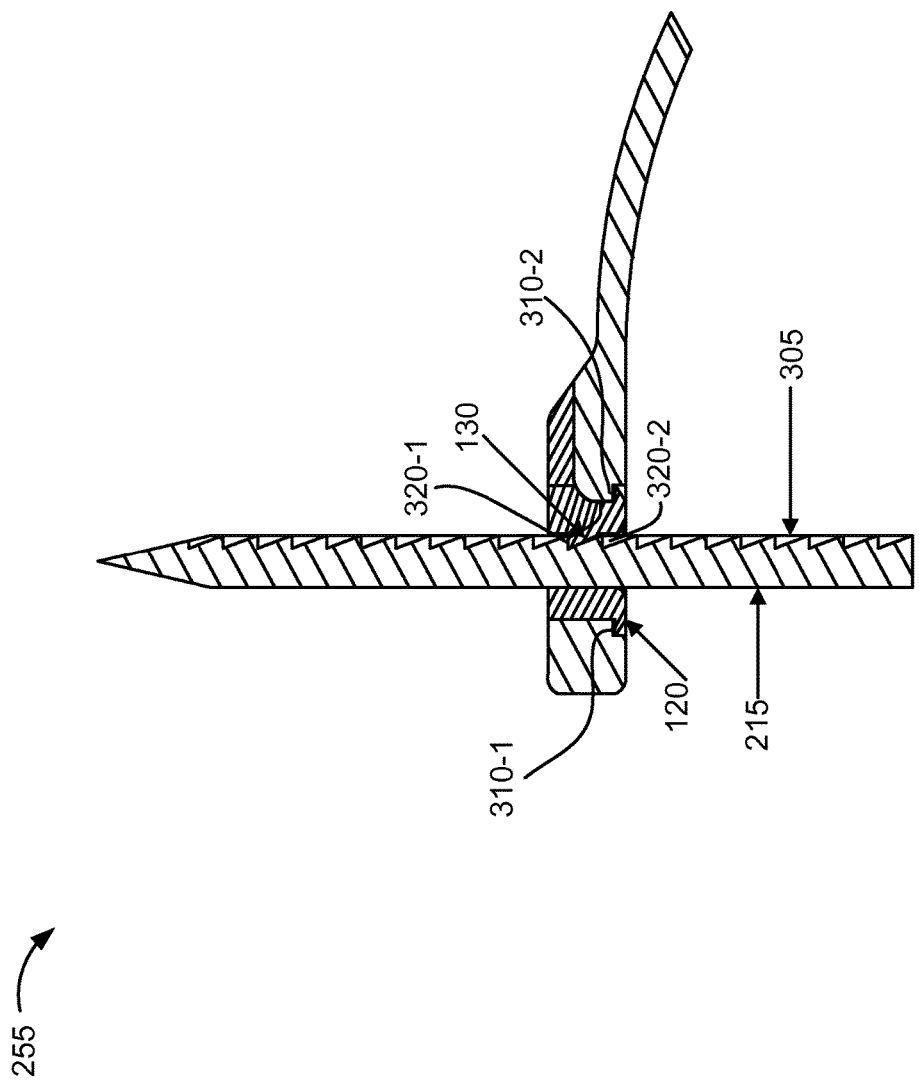

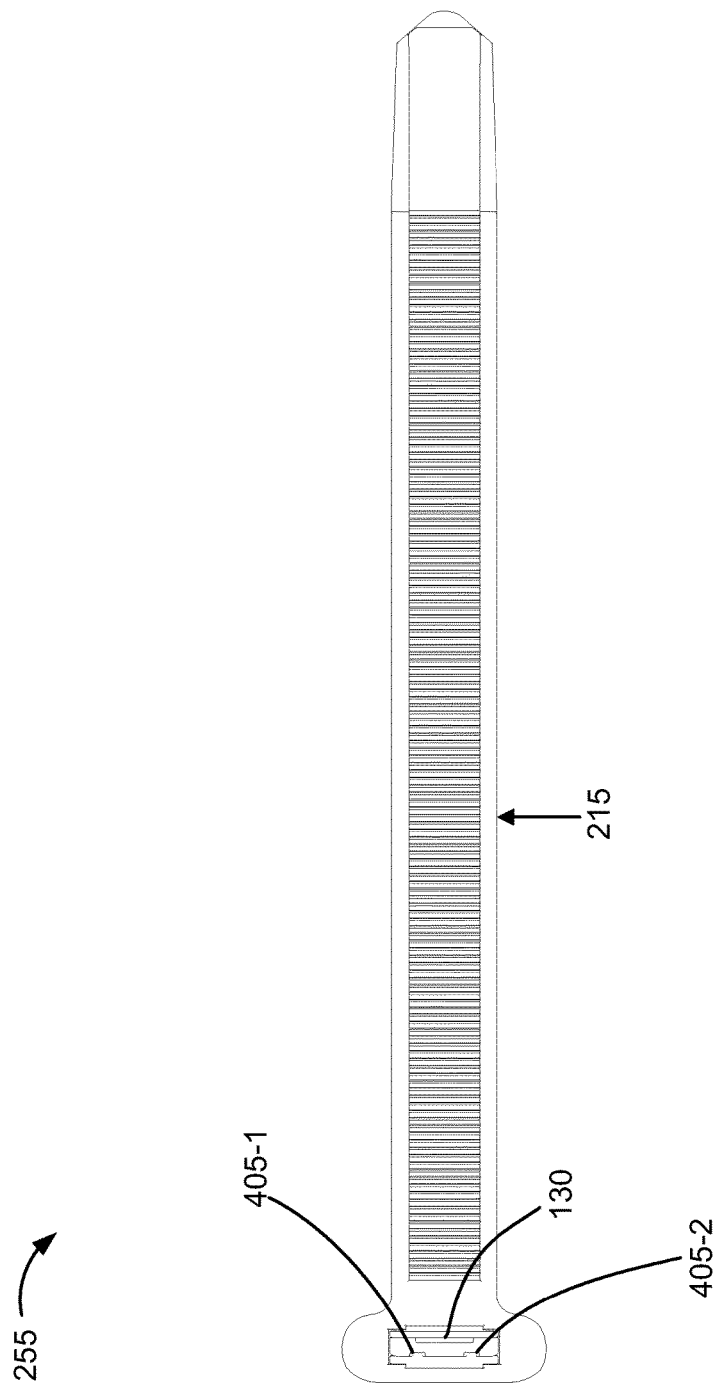

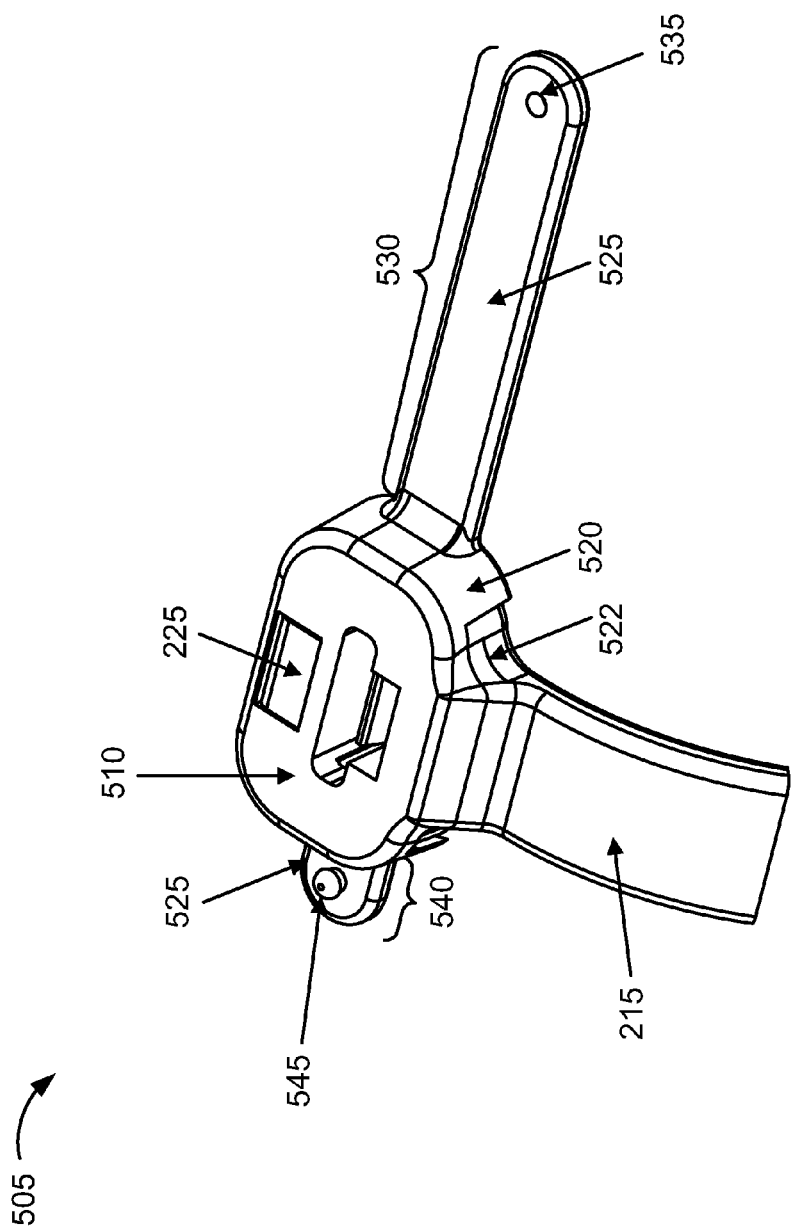

CABLE TIE HEAD

CROSS-REFERENCE TO RELATED APPLICATIONS

This application is a Divisional application of U.S. patent application Ser. No. 13/790,452, filed Mar. 8, 2013, which claims priority under 35 U.S.C. § 119, based on U.S. Provisional Patent Application No. 61/644,079, filed on May 8, 2012, the disclosures of which are both hereby incorporated herein by reference.

BACKGROUND

Cable ties are widely used in various industries to fasten, bundle, clamp, identify, etc., throughout various physical infrastructures. Typically, a cable tie is made from a pliable, flexible material in order for the cable tie to provide a wrap-around feature.

BRIEF DESCRIPTION OF THE DRAWINGS

FIG. 3A is a diagram illustrating a cross-sectional view of an exemplary embodiment of a cable tie;

FIG. 4A is a diagram illustrating a top view of an exemplary embodiment of a cable tie;

FIG. 5 is a diagram illustrating an isometric view of another exemplary embodiment of a cable tie.

DETAILED DESCRIPTION OF PREFERRED EMBODIMENTS

The following detailed description refers to the accompanying drawings. The same reference numbers in different drawings may identify the same or similar elements.

According to an exemplary embodiment, a cable tie includes a cable tie head and a cable tie body. According to an exemplary embodiment, the cable tie head is attachable to and detachable from the cable tie body. For example, the cable tie head is configured to snap onto and snap off of the cable tie body. According to an exemplary embodiment, the cable tie head is made from a different material than the cable tie body. According to an exemplary implementation, the cable tie head is made from a material that is harder than the cable tie body. According to another exemplary embodiment, the cable tie head is made from a same material as the cable tie body.

According to an exemplary embodiment, the cable tie head includes a head portion and leg portions. According to an exemplary embodiment, each leg portion includes an extension portion that is formed to couple the cable tie head with the cable tie body.

According to an exemplary embodiment, the cable tie head includes a skirt portion. The skirt portion allows an accessory portion to be formed with the skirt portion of the cable tie head. According to an exemplary embodiment, the accessory portion includes a fastener portion that is configured to receive a fastener (e.g., a nail, a screw, etc.). According to an exemplary use case, a user may use a fastener and the fastener portion to attach the cable tie to a surface. According to another exemplary embodiment, the accessory portion includes a spacer portion. According to an exemplary embodiment, the spacer portion includes a male strap portion and a female strap portion. According to an exemplary use case, a user may space (or concatenate) cable ties by inserting the male strap portion of one cable tie with the female strap portion of another cable tie.

According to an exemplary embodiment, the cable tie head includes one or multiple barbs. The one or multiple barbs are formed to couple with a strap of the cable tie body. According to exemplary implementation, the one or multiple barbs are formed with one of the leg portions of the cable tie head.

Figure 1A:
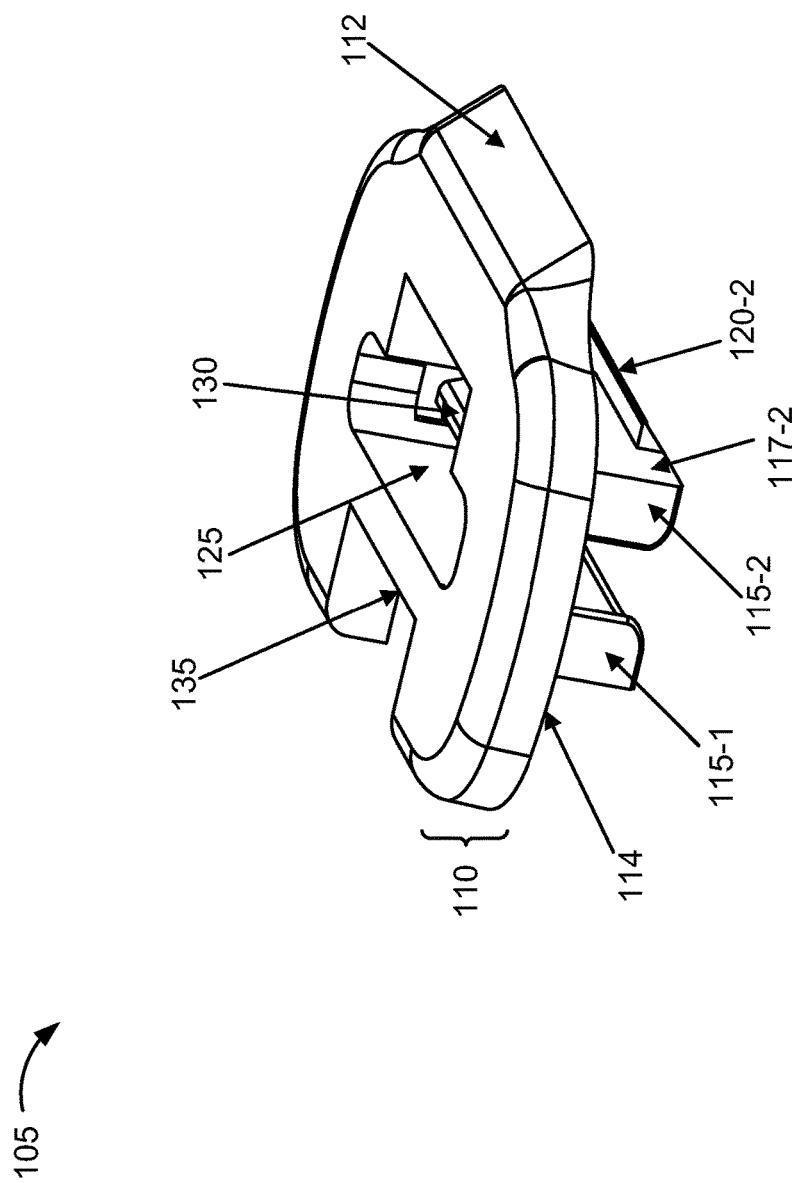
FIG. 1A is a diagram illustrating an isometric view of an exemplary embodiment of a cable tie head.
Figure 1B:
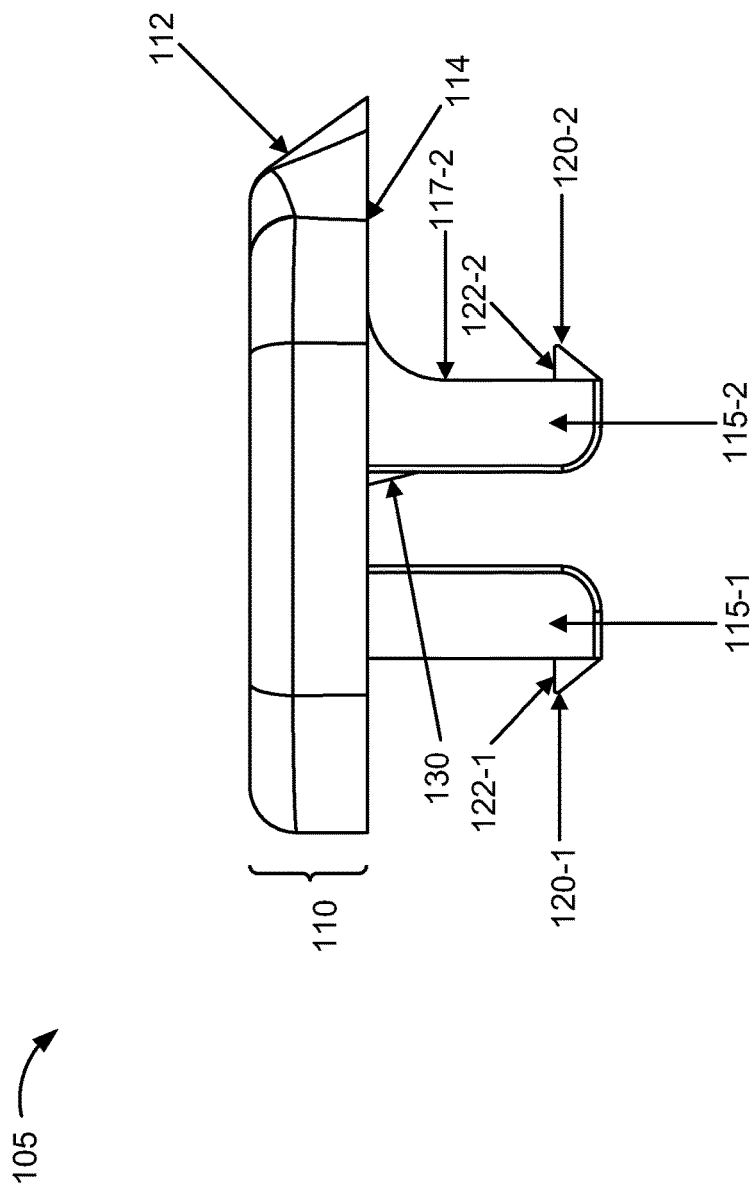
FIG. 1B is a diagram illustrating a side view of an exemplary embodiment of the cable tie head.

FIG. 1A is a diagram illustrating an isometric view of an exemplary embodiment of a cable tie head 105. FIG. 1B is a diagram illustrating a side view of an exemplary embodiment of cable tie head 105. Referring to FIG. 1A, as illustrated, cable tie head 105 includes a head portion 110 and leg portions 115-1 and 115-2 (also referred to collectively as leg portions 115 or individually as leg portion 115). Head portion 110 includes a sloped portion 112, a passageway 125, a barb portion 130, and a recess portion 135. As further illustrated, leg portion 115-2 includes an extension portion 120-2. Leg portion 115-1 also includes an extension portion 120-1, as illustrated in FIG. 1B. Extension portions 120-1 and 120-2 are also referred to collectively as extension portions 120 or individually as extension portion 120.

Cable tie head 105 may be made from a polymer material. The polymer material may include, for example, an unfilled or fiber-filled (e.g., glass, carbon, etc.) polycarbonate, polyaryletherketone, polyetheretherketone (PEEK), polysulfate, polyphenylene sulfide, polyetherimide, nylon, etc. Head portion 110 has a generally flattened mushroom shape that is formed to rest flatly on a cable tie body (not illustrated). Sloped portion 112 extends outwardly from the curvature of the perimeter of head portion 110.

Legs 115 extend substantially perpendicular from head portion 110. Legs 115 have a certain degree of flexibility to allow cable tie head 105 to couple with a cable tie body, as described further below. Extension portion 120 protrudes from leg 115. Referring to FIG. 1A, according to an exemplary implementation, extension portion 120-2 does not extend the entire length of side wall 117-2 of leg 115-2. According to another exemplary implementation, extension portion 120-2 may extend the entire length of side wall 117-2. Extension portion 120-1 may be similarly configured. Referring to FIG. 1B, according to an exemplary implementation, extension portion 120-1 and extension portion 120-2 include a top wall 122-1 and 122-2 (also referred to collectively as top walls 122 and individually as top wall 122). Top wall 122 extends substantially perpendicular from leg 115 and is substantially parallel to a wall 114 of head portion 110. Extension portion 120 provides a coupling function between cable tie head 105 and the cable tie body, as described further below. According to other implementations, extension portion 120 may be formed to another shape to provide a coupling function between cable tie head 105 and the cable tie body.

Referring to FIG. 1A, passageway 125 includes a hole shaped to receive a strap portion of the cable tie body. Barb portion 130 is formed to leg 115-2. Barb portion 130 is shaped to couple with the strap portion of the cable tie body. According to an exemplary implementation, cable tie head 105 includes a single barb portion 130. According to another exemplary implementation, cable tie head 105 includes multiple barb portions 130, as described further below. Recess portion 135 provides a space that is formed to receive a portion of the cable tie body, as described further below. According to an exemplary implementation, recess portion 135 is located at an opposite side of main body 110 from sloped portion 112.

Figure 2A:
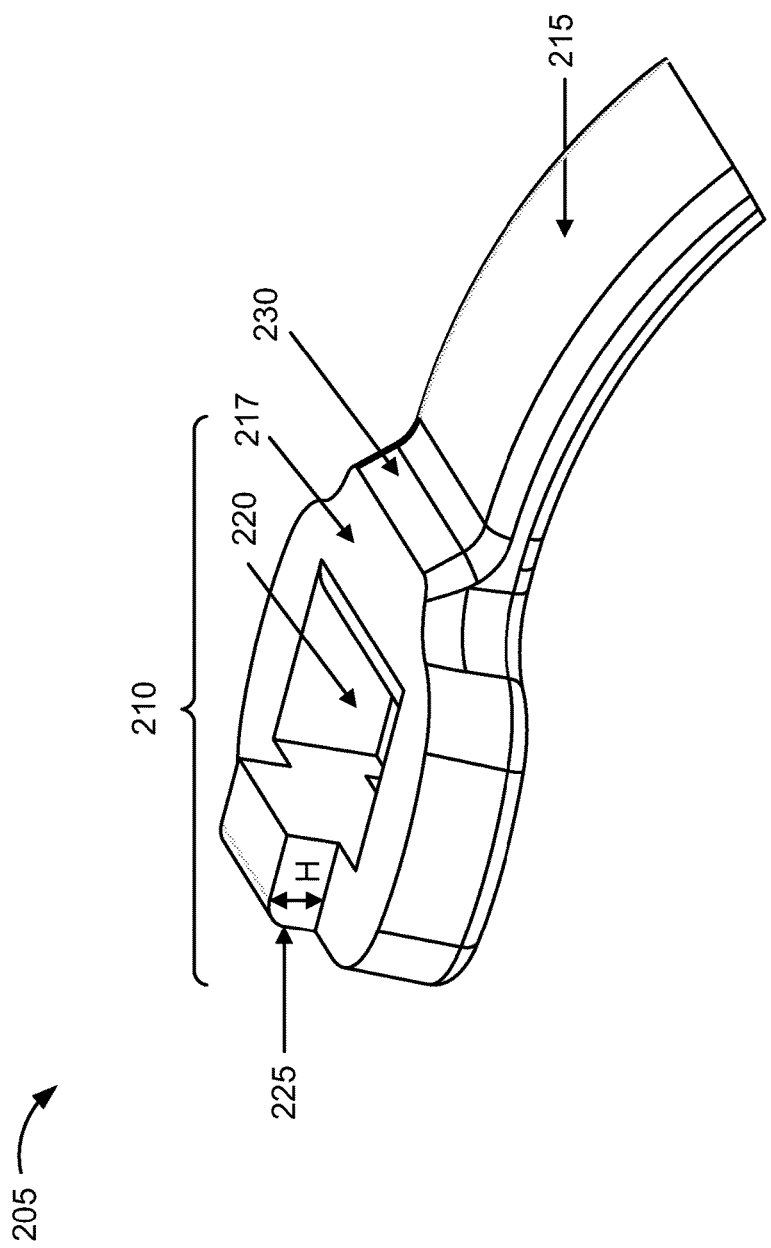
FIG. 2A is a diagram illustrating an isometric view of an exemplary embodiment of a cable tie body.

FIG. 2A is a diagram illustrating an isometric view of an exemplary embodiment of a cable tie body. As illustrated, a cable tie body 205 includes a main body portion 210 and a strap 215. Main body 210 includes a passageway 220, a protrusion 225, and a sloped portion 230.

Cable tie body 205 may be made from, for example, a flexible polymer (e.g., nylon, etc.). Main body 210 is formed to couple with cable tie head 105. Main body 210 includes a wall 217 that provides a platform for wall 114 of head portion 110. Passageway 220 includes a hole shaped to receive legs 115 and extension portions 120 of cable tie head 105. Protrusion 225 extends substantially perpendicular from wall 217 and is shaped to receive recess portion 135 of cable tie head 105. Protrusion 225 has a height (illustrated as H) substantially equal to a height of head portion 110. Sloped portion 230 is formed into strap 215 and provides a continuous contour in relation to sloped portion 112 of cable tie head 105 (e.g., when cable tie head 105 is secured within main body 210.

Figure 2B:
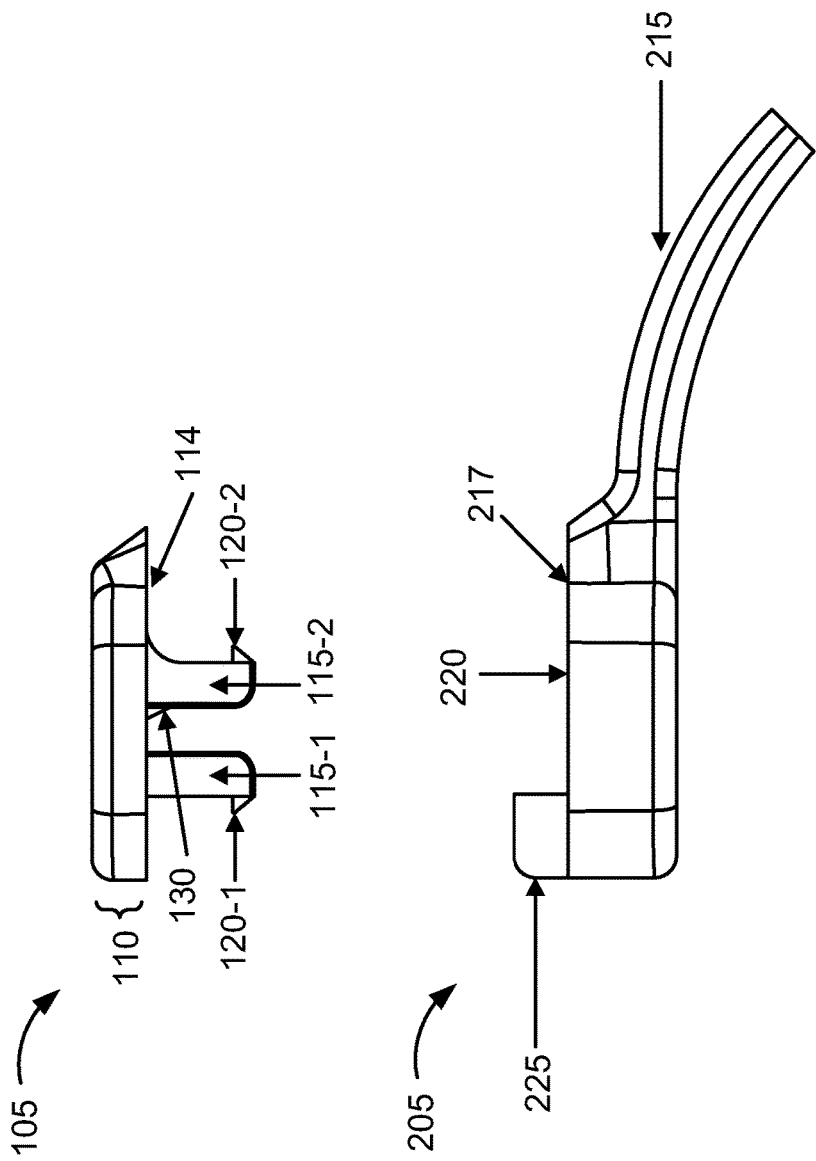
FIG. 2B is a diagram illustrating a side view of an exemplary embodiment of the cable tie head and the cable tie body.

FIG. 2B is a diagram illustrating a side view of an exemplary embodiment of the cable tie head and the cable tie body. Referring to FIGS. 2A and 2B, a user may join cable tie head 105 with cable tie body 205 by guiding legs 115 of cable tie head 105 into passageway 220 of cable tie body 205. Legs 115 have a certain degree of flexibility to allow legs 115 to pinch inwardly to allow the user to guide legs 115 through a passageway 220 of cable tie body 205. For example, as the user couples cable tie head 105 with cable tie body 205, extension portions 120 of legs 115 will come into contact with the wall(s) that define passageway 220, which causes legs 115 to pinch inwardly. According to this coupling process, when wall 114 of head portion 110 contacts wall 217 of main body 210, extension portions 120 extend into recess portion 310-1 and recess portion 310-2, respectively, (as referred to as recess portions 310 or individually as recess portion 310) of cable tie body 205, as illustrated in FIG. 3A. Recess portion 310 is formed to receive extension portion 120.

Figure 2C:
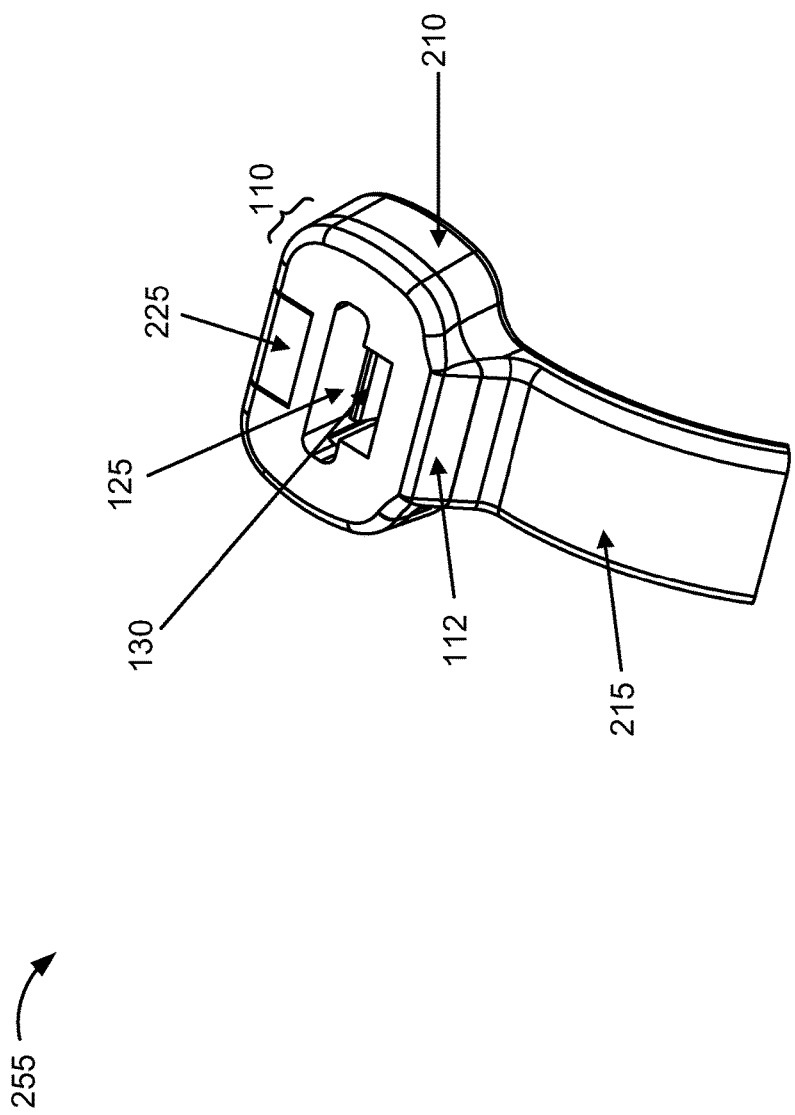
FIG. 2C is a diagram illustrating an isometric view of an exemplary embodiment of a cable tie.

FIG. 2C is a diagram illustrating an isometric view of an exemplary embodiment of a cable tie. As illustrated, cable tie 255 includes cable tie head 105 and cable tie body 205. Cable tie head 105 attaches to cable tie body 205 to form a unified element.

Referring back to FIG. 2A, according to another embodiment, main body 210 may not include protrusion 225. According to such an embodiment, cable tie head 105 may not include recess portion 135. Rather, referring to FIG. 1A, main body 110 may replace recess portion 135.

Figure 3B:
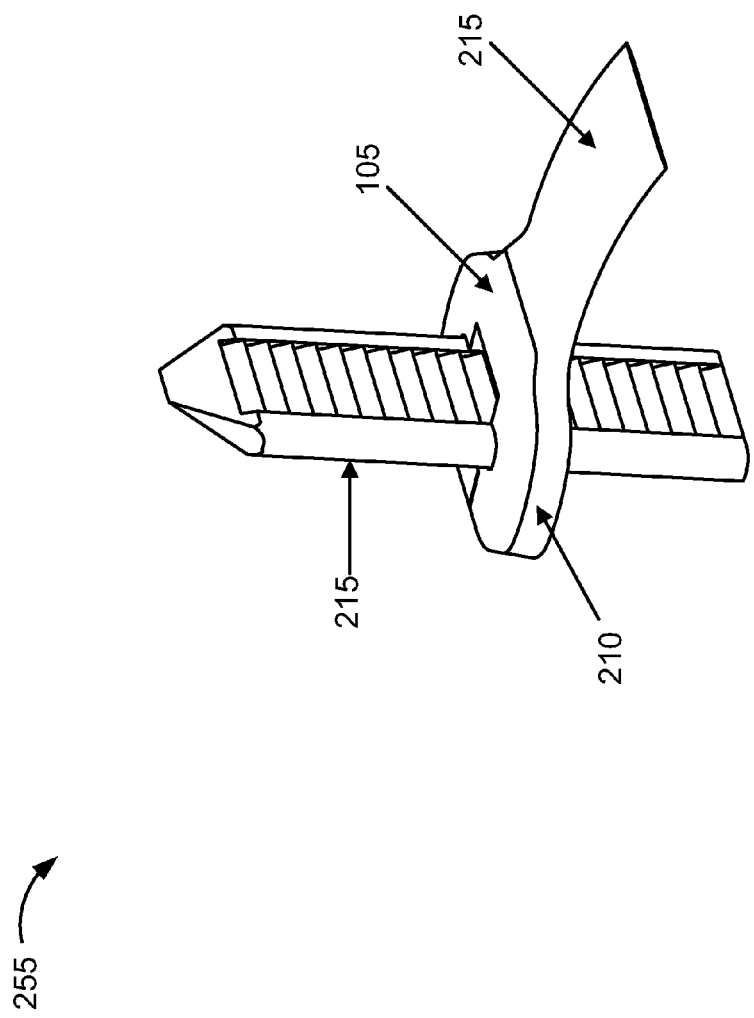
FIG. 3B is a diagram illustrating an isometric view of an exemplary embodiment of the cable tie.

FIG. 3A is a diagram illustrating a cross-sectional view of an exemplary embodiment of cable tie 255. According to this illustration, strap 215 is engaged with cable tie head 105 and main body 210. As illustrated, strap 215 includes a series of teeth 305 that allows a user to have barb portion 130 of cable tie head 105 engage with a tooth 320-1 of strap 215. As previously described, according to another exemplary embodiment, cable tie head 105 may include multiple barb portions 130. For example, another barb portion 130 may be formed to engage with a tooth 320-2. FIG. 3B is a diagram illustrating an isometric view of an exemplary embodiment of cable tie 255.

Figure 4B:
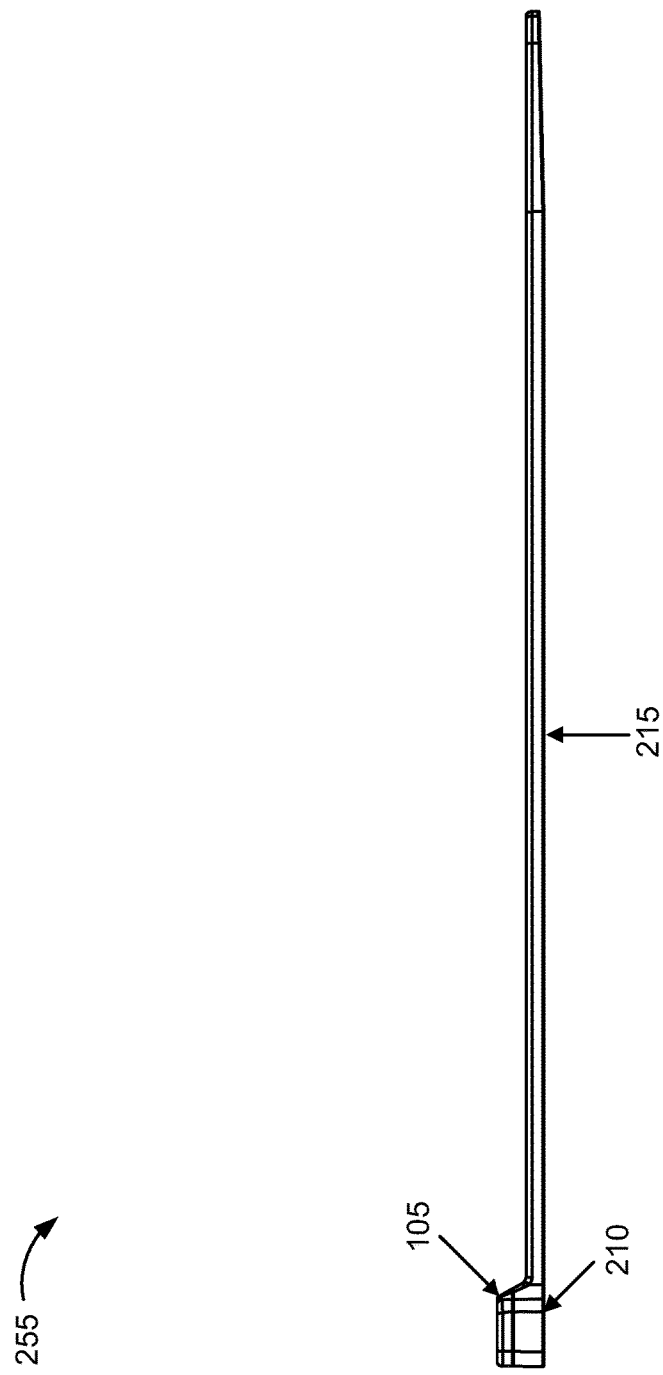
FIG. 4B is a diagram illustrating a side view of an exemplary embodiment of a cable tie.
Figure 4C:
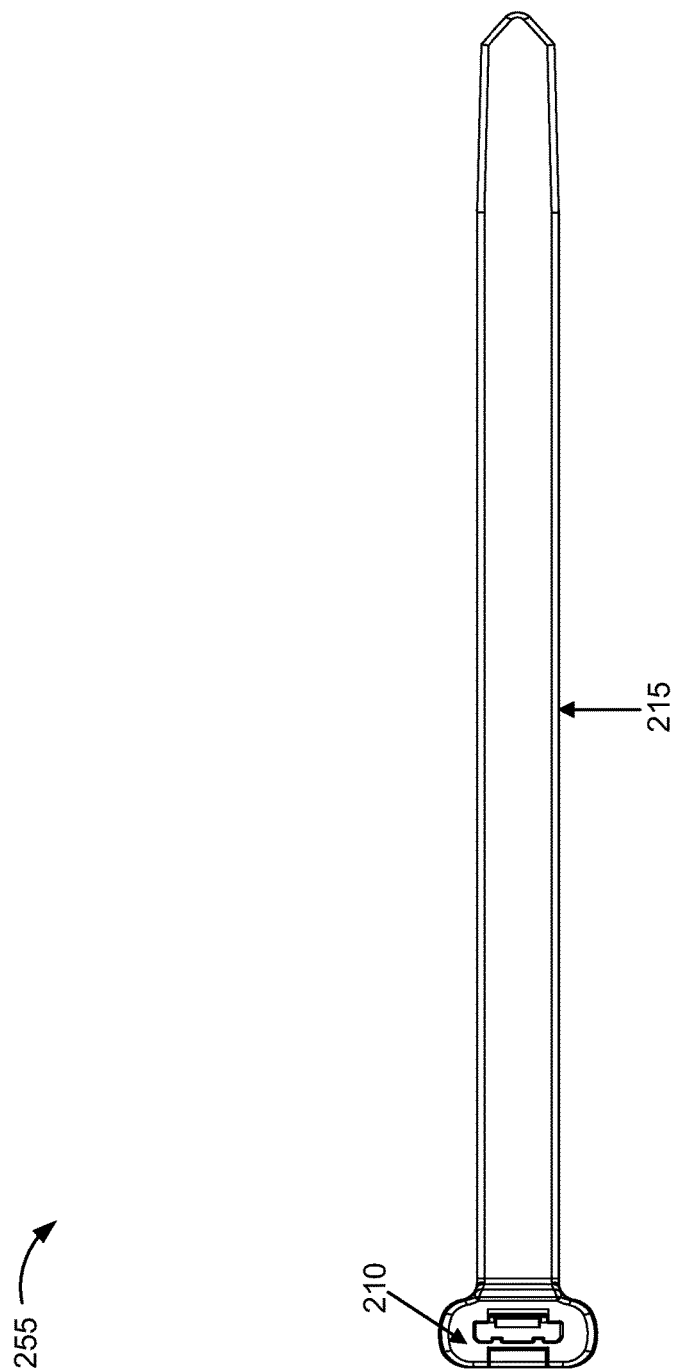
FIG. 4C is a diagram illustrating a bottom view of an exemplary embodiment of a cable tie.

FIG. 4A is a diagram illustrating a top view of an exemplary embodiment of a cable tie. As illustrated, according to an exemplary embodiment, cable tie head 105 includes bumps 405-1 and 405-2 (also referred to as bumps 405 and individually as bump 405). Bumps 405 may assist the user in guiding strap 215 into passageway 125 and engage barb 130 with one of teeth 305. FIG. 4B is a diagram illustrating a side view of an exemplary embodiment of a cable tie. FIG. 4C is a diagram illustrating a bottom view of an exemplary embodiment of a cable tie.

FIG. 5 is a diagram illustrating an isometric view of another exemplary embodiment of a cable tie. A cable tie 505 includes a cable tie head 510 and cable tie body 205. In contrast to cable tie head 105, cable tie head 510 includes a skirt portion 520 that extends along a perimeter of side wall 522 of main body portion 210. As further illustrated, an accessory portion 525 is formed with skirt portion 520. According to this embodiment, accessory portion 525 includes a female strap portion 530 that includes a hole 535, and a male strap portion 540 that includes a bulb 545.

According to an exemplary use case, a user may couple a first cable tie 505 with a second cable tie 505. For example, bulb 545 of the second cable tie 505 may be inserted into hole 535 of the first cable tie 505. Cable ties 505 may be spaced (e.g., evenly spaced) from each other. According to another exemplary implementation, female strap portion 530 may include multiple holes 535. According to yet another exemplary implementation, female strap portion 530 may include a strap portion that is adjustable (e.g., in length) to allow different spacing between cable ties 505.

Figure 6:
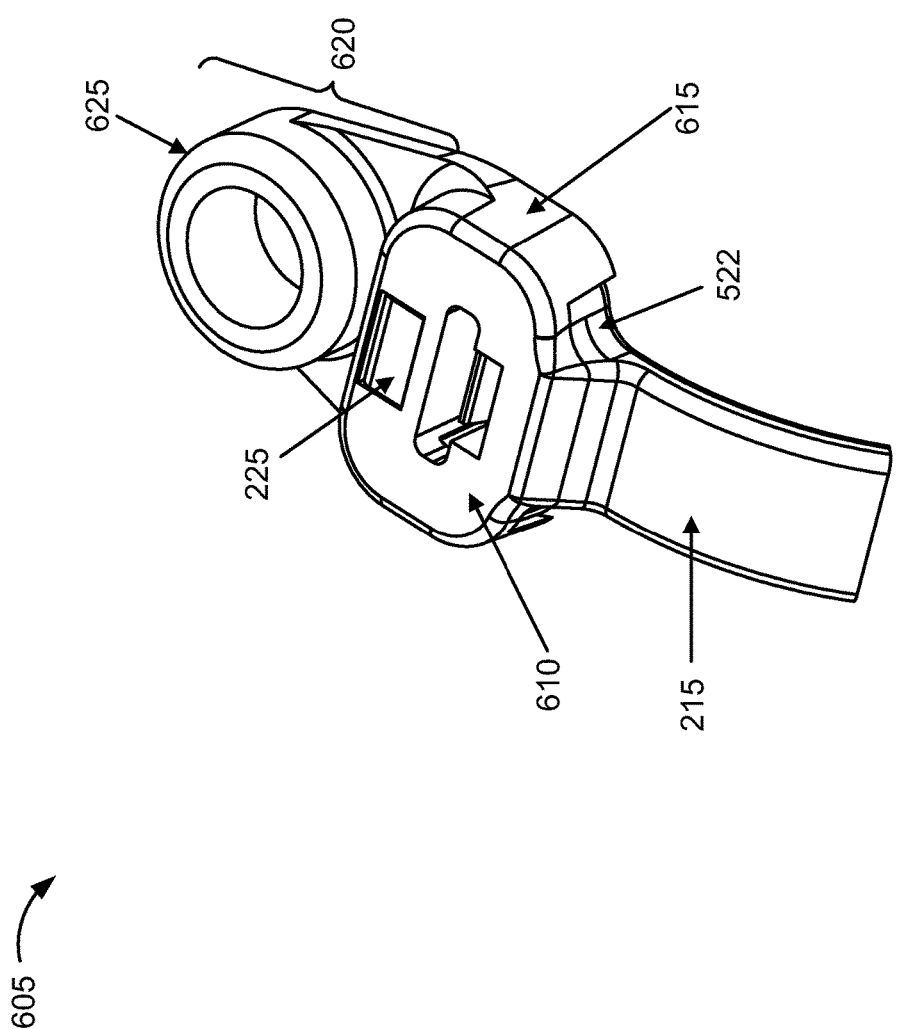
FIG. 6 is a diagram illustrating an isometric view of still another exemplary embodiment of a cable tie.

FIG. 6 is a diagram illustrating an isometric view of still another exemplary embodiment of a cable tie. A cable tie 605 includes a cable tie head 610 and cable tie body 205. Cable tie head 610 includes a skirt portion 615 that is formed with a fastener portion 620. According to this embodiment, fastener portion 620 includes a tubular portion 625 that is formed to receive various types of fasteners (e.g., a screw, a nail, a bolt, etc.). According to an exemplary use case, a user may attach cable tie 605 to a surface (e.g., a wall, etc.) by inserting a fastener into tubular portion 625.

Skirt portion 520 and skirt portion 615 allows various types of accessories to be formed. Thus, while FIGS. 5 and 6 provide two examples of such accessories, other types of accessories may be added to a cable tie head based on this configuration.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

Spatially relative terms, such as "top," "side," etc., may be used herein for ease of description to describe one element's or feature's relationship to another element or feature as illustrated in the figures. The spatially relative terms are intended to encompass different orientations of the element. For example, if the element in the figure is turned over, an element described as "below" or "beneath" another element or another feature would then be oriented "above" the other element or the other feature.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s).

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

What is claimed is:

1. A cable tie comprising:
    a cable tie head comprising:
        a head portion,
        legs that extend substantially perpendicularly from the head portion, and
        a top wall that includes a passageway that extends substantially perpendicularly to the top wall, wherein the passageway is partially defined by the legs; and
        a skirt wall extending from the top wall; and
    a cable tie body comprising:
        a main body that includes a body passageway, and a strap,
        wherein the cable tie head is attachable to and detachable from the cable tie body,
    wherein the body passageway is formed to receive the legs for coupling the cable tie head with the cable tie body,
    wherein the passageway is formed to receive the strap, and
    wherein the skirt wall covers at least a portion of a side wall of the main body when the cable tie head is attached to the cable tie body.

2. The cable tie of claim 1, wherein the cable tie head is made from a different material than the cable tie body.

3. The cable tie of claim 1, wherein the head portion includes a recess to receive a protrusion that extends substantially perpendicularly from a wall of the main body.

4. The cable tie of claim 1, wherein a fastener portion, formed to receive a fastener, extends from the skirt wall.

5. The cable tie of claim 1, wherein a spacer strap extends from a portion of the skirt wall, wherein the spacer strap includes a hole, and another spacer strap extends from another portion of the skirt wall, wherein the other spacer strap includes a bulb that is shaped for the hole.

6. The cable tie of claim 1, wherein one of the legs includes one or more barbs that extend from the one of the legs to engage with one or more teeth of the strap.

7. The cable tie of claim 1, wherein each leg includes a protrusion to engage with a recess formed in the main body.

8. A cable tie comprising:
    a cable tie head comprising:
        a head portion,
        legs that extend substantially perpendicularly from the head portion,
        a top wall that includes a passageway that extends substantially perpendicularly to the top wall, and
        a skirt wall extending substantially perpendicularly from the top wall; and
    a cable tie body comprising:
        a main body that includes a body passageway, and
        a strap, wherein the cable tie head is attachable to and detachable from the cable tie body, and wherein the body passageway is formed to receive the legs for coupling the cable tie head with the cable tie body, wherein the cable tie head is made from a different material than the cable tie body, wherein the passageway is partially defined by the legs and is formed to receive the strap; and
    wherein the skirt wall covers at least a portion of a side wall of the main body when the cable tie head is attached to the cable tie body.

9. The cable tie of claim 8, wherein a fastener portion, formed to receive a fastener, extends from the skirt wall.

10. A cable tie comprising:
    a cable tie head comprising:
        a head portion,
        legs that extend substantially perpendicularly from the head portion,
        a top wall that includes a passageway that extends substantially perpendicularly to the top wall, and
        a skirt wall extending substantially perpendicularly from the top wall; and
    a cable tie body comprising:
        a main body that includes a body passageway, and
        a strap, wherein the cable tie head is attachable to and detachable from the cable tie body, and wherein the body passageway is formed to receive the legs for coupling the cable tie head with the cable tie body, wherein the cable tie head is made from a different material than the cable tie body,
    wherein the skirt wall covers at least a portion of a side wall of the main body when the cable tie head is attached to the cable tie body,
    wherein a spacer strap extends substantially perpendicularly from a portion of the skirt wall, wherein the spacer strap includes a hole, and another spacer strap extends substantially perpendicularly from another portion of the skirt wall, wherein the other spacer strap includes a bulb that is shaped for the hole.

11. The cable of claim 8, wherein one of the legs includes one or more barbs that extend from the one of the legs to engage with a tooth of the strap.

12. The cable tie of claim 8, wherein each leg includes a protrusion to engage with a recess formed in the main body.

13. The cable tie of claim 8, wherein a wall of the main body includes a protrusion that extends substantially perpendicularly from the wall and is shaped to receive a recess formed in the head portion, wherein a length of the protrusion is substantially equal to a height of the head portion.

14. The cable tie of claim 13, wherein a portion of the skirt wall of the head portion opposite to the recess has a different slope than another portion of the skirt wall.

* * * * *